E. E. BERRY.
WHEEL MOUNTING.
APPLICATION FILED MAR. 6, 1919.

1,380,462.

Patented June 7, 1921.

WITNESS:
Rob. R. Kitchel

INVENTOR
Earl E. Berry
BY
Frank L. Busser
ATTORNEY.

UNITED STATES PATENT OFFICE.

EARL E. BERRY, OF KENNETT SQUARE, PENNSYLVANIA, ASSIGNOR TO AMERICAN ROAD MACHINERY COMPANY, INC., OF KENNETT SQUARE, PENNSYLVANIA, A CORPORATION OF DELAWARE.

WHEEL-MOUNTING.

1,380,462. Specification of Letters Patent. Patented June 7, 1921.

Application filed March 6, 1919. Serial No. 280,972.

*To all whom it may concern:*

Be it known that I, EARL E. BERRY, a citizen of the United States, residing at Kennett Square, county of Chester, and State of Pennsylvania, have invented a new and useful Improvement in Wheel-Mountings, of which the following is a full, clear, and exact description, reference being had to the accompanying drawings, which form a part of this specification.

The object of my invention is to provide means for retaining vehicle wheels on their axles and keeping dust from the bearings. A preferred embodiment of the invention is shown in the accompanying drawings, in which—

Figures 1, 2:
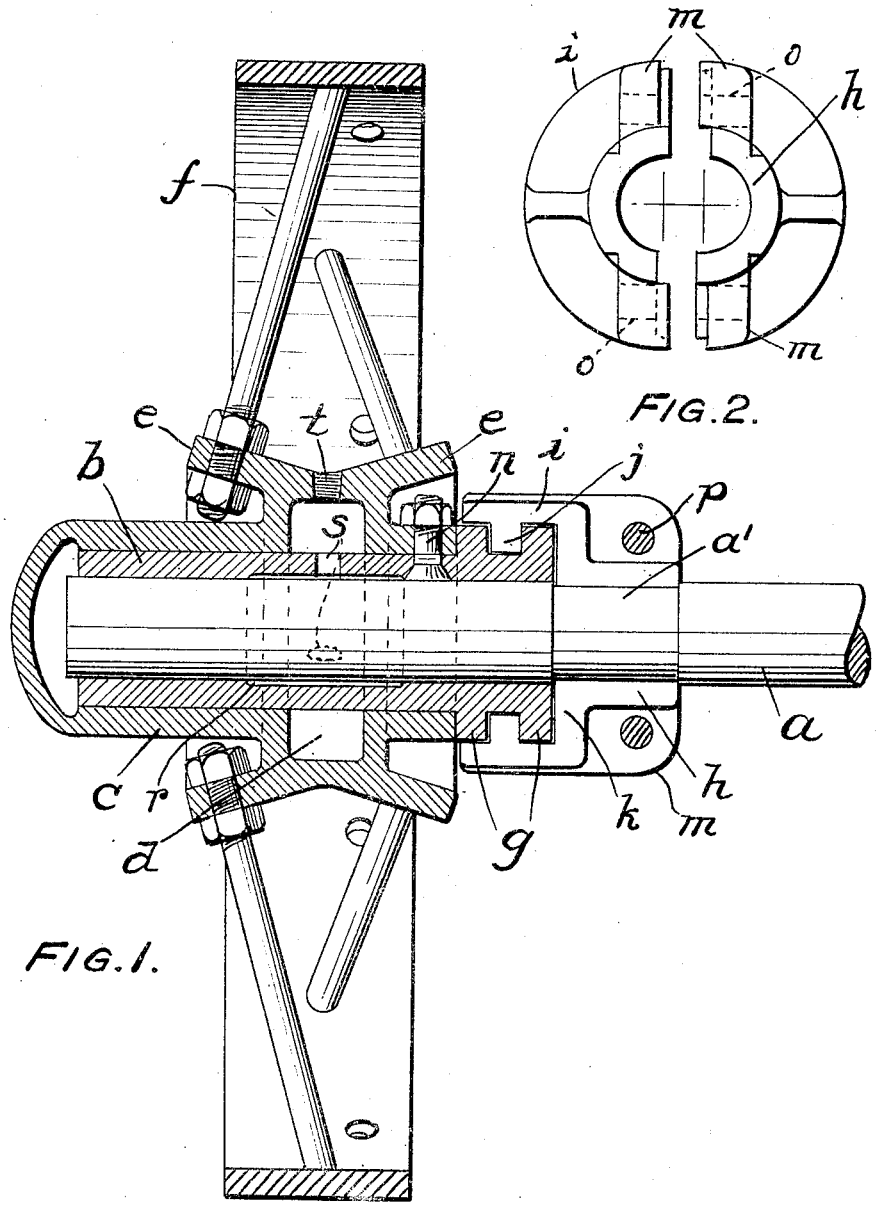
Figure 1 is a sectional view along the axle.
Fig. 2 is an end view of the dust cap parts separated.

On the axle $a$ is turnable a sleeve $b$ to which is secured the wheel hub $c$ having a closed end. The sleeve and hub are secured together by means of a bolt $n$ inserted from the interior, thus preventing the removal of the bolt after the sleeve and wheel are assembled on the axle. Between its ends the hub is provided with a hollow annular enlargement $d$ provided with oppositely extending annular wings $e$ overhanging the hub and diverging somewhat away from the axis. To these wings the spokes of the wheel $f$ are secured.

The end of the sleeve $b$ opposite its closed end is provided with two annular ribs $g$ spaced apart to form an annular groove for engagement with the dust-cap. Beyond the same end of the sleeve the axle $a$ is of reduced diameter. The dust-cap has a contracted cylindrical neck $h$ adapted to fit within the part $a'$ of the axle of reduced diameter, a cylindrical body $i$ of greater diameter having an internal rib $j$ adapted to fit within the groove between the ribs $g$ of the sleeve, and a radially extending member $k$ connecting the neck and body.

The dust-cap is made in two sections, preferably of two equal halves divided on a plane extending lengthwise through the cap. Each section is provided with webs $m$ having holes $o$ extending tangentially to the sleeve $b$ for the reception of bolts $p$ for clamping together the two sections of the dust-cap.

The sleeve $b$ is provided on its interior with a wide shallow annular groove $r$ and is perforated with several holes $s$ affording communication between the groove $r$ and the hollow interior of the enlargement $d$. Between the wings $e$, the enlarged part of the hub has a threaded opening $t$ through which oil may be introduced into the interior of the part $d$, the oil flowing through the holes $s$ and lubricating the bearing between the axle $a$ and sleeve $b$. The hole $t$ may be closed by a plug not shown.

The engagement of the dust-cap with a contracted part of the axle insures against lengthwise displacement of the sleeve and wheel as well as of the dust-cap itself.

Having now fully described my invention, what I claim and desire to protect by Letters Patent is:

In a vehicle wheel mounting, the combination with a cylindrical axle, of a long hub member rotatably mounted thereon, said hub member having an annular groove in its periphery near the inner end, there being an annular groove in the periphery of the axle near the inner end of the hub member, a split dust guard and hub retainer bolts for clamping the guard about the axle and within the groove in the axle to restrain said guard from rotary and endwise movement in either direction along the axle, and an annular flange in the guard seated in the groove of the hub member for retaining said hub member in position on the axle.

In testimony of which invention, I have hereunto set my hand, at Kennett Square, Pa,. on this 3rd day of March, 1919.

EARL E. BERRY.